Figure 1:
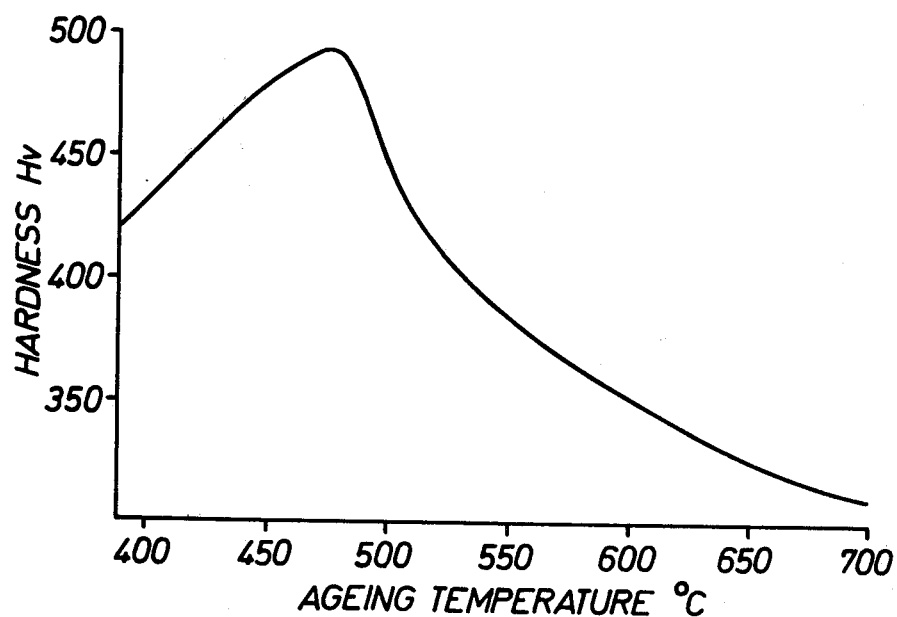

United States Patent [19]

McCann et al.

[11] 4,143,258

[45] Mar. 6, 1979

[54] WELDING MICROSTRUCTURE CONTROL

[75] Inventors: John McCann; Trevor Bagshaw, both of Sheffield, England

[73] Assignee: British Steel Corporation, London, England

[21] Appl. No.: 769,561

[22] Filed: Feb. 17, 1977

[30] Foreign Application Priority Data

Feb. 27, 1976 [GB] United Kingdom ............... 7838/76

[51] Int. Cl.² ........................... B23K 9/04; B23K 9/18
[52] U.S. Cl. ................................ 219/73; 219/76.14; 219/137 WM; 219/146.23
[58] Field of Search ............. 219/73 R, 76, 137 WM, 219/145, 146, 76.14, 146.23

[56] References Cited

U.S. PATENT DOCUMENTS

| | | | |
|---|---|---|---|
| 3,549,410 | 12/1970 | Farmer, Jr. | 219/76 X |
| 3,571,553 | 3/1971 | Godai et al. | 219/73 R |
| 3,975,610 | 8/1976 | Bagshaw et al. | 219/76 |

Primary Examiner—Richard R. Kucia

Attorney, Agent, or Firm—Bacon & Thomas

[57] ABSTRACT

A method of applying a hard facing of an iron or steel former (e.g. a roll of a rolling mill) in which a consumable electrode is melted on to the surface of the former by a submerged arc or gas shielding welding process and in which the former and the welding head are moved relative to one another to deposit a bead of weld metal on to the former. The consumable electrode is chosen to give a weld metal deposit comprising by weight, from 0.03% to 0.12% carbon, from 0.20% to 0.75% silicon, from 0.50% to 1.50% manganese, from 4.50% to 6.50% nickel, from 12.0% to 17.0% chromium, from 1.5% to 2.0% molybdenum, from 1.2% to 2.0% copper, from 0.2% to 0.9% niobium, up to 0.04% sulphur, up to 0.04% phosphorus and up to 0.06% nitrogen, the balance being iron and incidental impurities, the ratio of nickel and copper to the carbide forming elements being chosen to achieve a microstructure of between 3% and 10% delta-ferrite in the interdentritic regions thereof.

4 Claims, 4 Drawing Figures

WELDING MICROSTRUCTURE CONTROL

This invention relates to a submerged arc or gas shielded welding process and particularly to the use of such process in the deposition of weld metal from a consumable electrode on to a former to provide a hard faced article such as for example a hard faced work roll or back up roll for use in a rolling mill for metals.

It is an object of the invention to provide a new or improved method of providing a hard faced article utilising either submerged arc or gas shielded welding and it is also an object of the invention to provide a hard faced article produced by such a method.

In accordance with one aspect of the invention there is provided a method of applying a hard facing to an iron or steel former having a composition other than that of the hard facing comprising melting a consumable electrode on to the former by a submerged arc or gas shielded welding process and moving the former and the welding head relative to one another to deposit a bead of heat treatable precipitation hardening martensitic stainless steel weld metal on to the former, the consumable electrode being chosen to give a said deposited weld metal comprising, by weight, from 0.03% to 0.12% carbon, from 0.20% to 0.75% silicon, from 0.50% to 1.50% manganese, from 4.50% to 6.50% nickel, from 12.0% to 17.0% chromium, from 1.5% to 2.0% molybdenum, from 1.2% to 2.0% copper, from 0.2% to 0.9% niobium, up to 0.04% sulphur, up to 0.04% phosphorus and up to 0.06% nitrogen, the balance being iron and incidental impurities, the ratio of nickel and copper to the carbide forming elements being chosen to achieve a microstructure of between 3% and 10% delta-ferrite in the interdentritic regions thereof.

Also in accordance with the invention there is provided a hard faced article produced by the method in accordance with the preceding paragraph and in particular there is provided a hard faced work roll or back up roll for a rolling mill produced by the said method.

In one preferred aspect of the inventin the deposited weld metal comprises by weight from 0.03% to 0.05% carbon, from 0.4% to 0.6% silicon, from 0.8% to 1.2% manganese, from 5.2% to 5.5% nickel, from 13.5% to 14.5% chromium, from 1.5% to 2.0% Molybdenum, from 1.2% to 2.0% copper, from 0.25% to 0.5% niobium, from 0.01% to 0.02% nitrogen with sulphur and phosphorus each being no more than 0.04% and as low as possible, the balance being iron and impurities.

It will be appreciated that, when the submerged arc welding process is utilised, it is necessary to employ a flux having characteristics which, together with those of the electrode, are chosen to give a said deposited weld metal as set forth in the preceding paragraphs.

Figure 2:
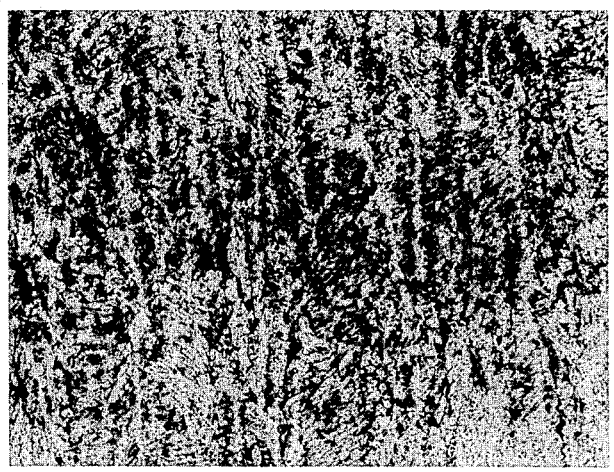
Figure 3:
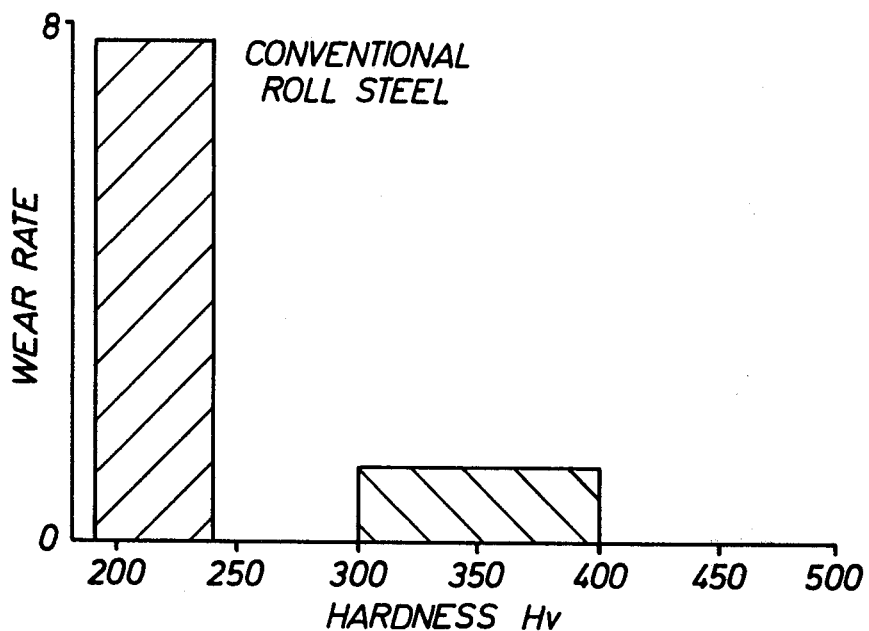
Figure 4:
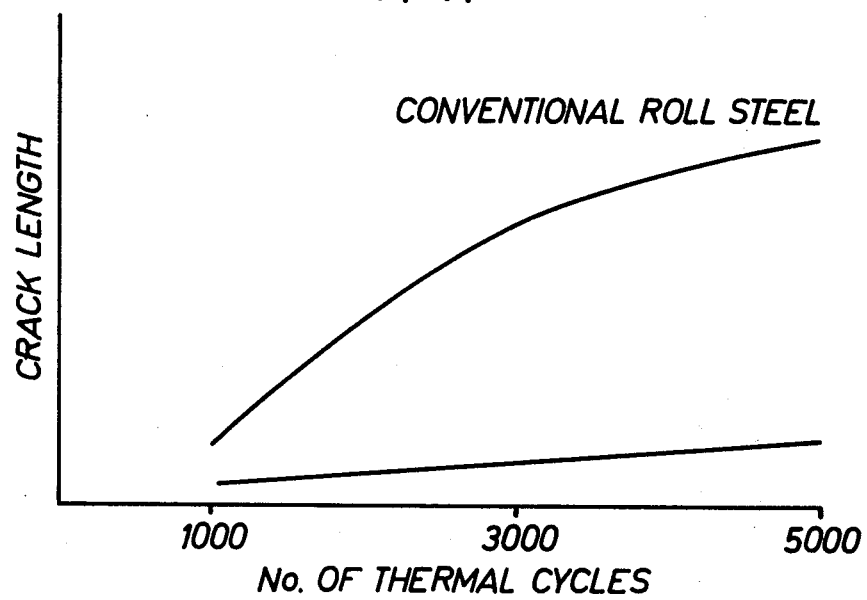

Other features of the invention will become apparent from the following description given solely by way of example with reference to the accompanying drawings wherein:

FIG. 1 is a diagram indicating the age hardening characteristics of weld metal deposited by the submerged arc welding process in accordance with the invention, FIG. 2 is an illustration of the microstructure, to a magnification of one hundred times, of the said deposited weld metal, FIG. 3 is a diagram illustrating the wear properties of the said deposited weld metal in comparison with conventional roll steel, and FIG. 4 is a diagram illustrating the thermal fatigue properties of the said deposited weld metal in comparision with conventional roll steel.

The submerged arc welding process is utilised in accordance with one embodiment of the invention for producing hard faced articles comprising built-up layers of deposited weld metal on an iron or steel former. Specifically the invention contemplates a method of hard facing work rolls, or back up rolls, for use in a rolling mill for metals and comprises applying a continuous bead of weld metal from a weld head to a steel arbor. Typically the arbor may be supported at each of its ends in horizontal orientation, preheated from underneath and rotated slowly about its longitudinal axis, whilst a welding head to which is fed a consumable electrode and suitable flux, it traversed longitudinally of the arbor at its upper side.

The consumable electrode and the flux are melted on to the arbor by a submerged arc welding process to deposit a continuous bead of weld metal which will be built up in a substantially spiral fashion as the arbor is rotated and the welding head is traversed longitudinally thereof from end to end. After a sufficient quantity of weld metal has been deposited, the arbor is removed from its supporting assembly and the weld metal deposited thereon is heat treated and machined to provide an appropriate roll finish.

In one example of the deposition of a hard facing on a rolling mill roll in accordance with the invention the facing comprises a heat treatable precipitation hardening martensitic stainless steel weld metal capable of achieving a range of hardness levels from 350 to 500 Hv by selection of the ageing treatment. A consumable electrode which may be either a solid wire or a mild steel tube containing alloy powder to give the required weld metal deposit is utilised in conjunction with a self releasing flux which is of the neutral or semi-basic type to provide a weld metal comprising by weight from 0.03% to 0.05% carbon, from 0.4% to 0.6% silicon, from 0.8% to 1.2% manganese, from 5.2% to 5.5% nickel, from 13.5% to 14.5% chromium, from 1.5% to 2.0% molybdenum, from 1.2% to 2.0% copper, from 0.25% to 0.5% niobium, from 0.01% to 0.02% nitrogen with sulphur and phosphorus each being no more than 0.04% and as low as possible, the balance being iron and impurities and the ratio of nickel and copper to the carbide forming elements being chosen to achieve a microstructure of between 3% and 10% delta-ferrite in the interdentritic regions thereof and the manganese and silicon being chosen in a ratio of approximately 2:1.

The submerged arc welding process is carried out utilising either a single or twin consumable electrode at 450 to 1050 amps to 29 to 32 volts utilising respective preheat and interpass temperatures to the arbor of 200° C. minimum and 450° C. maximum; direct current either positive or negative.

The transformation characteristics of this deposited weld metal facilitate at welding the production of a low carbon martensite substantially free of retained austenite and ferrite and capable of being aged to a range of hardness 350 to 500 Hv. FIG. 1 shows the age hardening characteristics of such a said deposit and FIG. 2 illustrates the microstructure after ageing at 550° C. Hardening results from the precipitation of an intermetallic compound in the martensitic matrix.

FIG. 3 illustrates an examination of the wear properties, over the range 300 to 400 Hv over aged at 550° C. to 700° C. whereby it will be noted that the wear resistance of the weld metal in accordance with the invention is substantially better than that for conventional roll steel. FIG. 4 shows a similar comparison between the weld metal of the invention and conventional roll steel in respect of thermal fatigue resistance of material aged at 550° C.

We claim:

1. A method of applying a hard facing to an iron or steel former having a composition other than that of the hard facing comprising melting a consumable electrode on to the former by a submerged arc welding process and moving the former and the welding head relative to one another to deposit a bead of heat treatable precipitation hardening martensitic stainless steel weld metal on to the former, the consumable electrode being chosen to give a said deposited weld metal comprising by weight, from 0.03% to 0.12% carbon, from 0.20% to 0.75% silicon, from 0.50% to 1.50% manganese, from 4.50% to 6.50% nickel, from 12.0% to 17.0% chromium, from 1.5% to 2.0% molybdenum, from 1.2% to 2.0% copper, from 0.2% to 0.9% niobium, up to 0.04% sulphur, up to 0.04% phosphorus and up to 0.06% nitrogen, the balance being iron and incidental impurities, the ratio of nickel and copper to the carbide forming elements being chosen to achieve a microstructure of between 3% and 10% delta-ferrite in the interdentritic regions thereof.

2. A method as claimed in claim 1 wherein the consumable electrode is chosen to give a deposited weld metal comprising by weight from 0.03% to 0.05% carbon, from 0.4% to 0.6% silicon, from 0.8% to 1.2% manganese, from 5.2% to 5.5% nickel, from 13.5% to 14.5% chromium, from 1.5% to 2.0% molybdenum, from 1.2% to 2.0% copper, from 0.25% to 0.5% niobium, from 0.01% to 0.02% nitrogen with sulphur and phosphorus each being below 0.04%, the balance being iron and impurities.

3. A method of applying a hard facing to an iron or steel former having a composition other than that of the hard facing comprising melting a consumable electrode on to the former by a gas shielding welding process and moving the former and the welding head relative to one another to deposit a bead of heat treatable precipitation hardening martensitic stainless steel weld metal on to the former, the consumable electrode being chosen to give a said deposited weld metal comprising, by weight, from 0.03% to 0.12% carbon, from 0.20% to 0.75% silicon, from 0.50% to 1.50% manganese, from 4.50% to 6.50% nickel, from 12.0% to 17.0% chromium, from 1.5% to 2.0% molybdenum, from 1.2% to 2.0% copper, from 0.2% to 0.9% niobium, up to 0.04% sulphur, up to 0.04% phosphorus and up to 0.06% nitrogen, the balance being iron and incidental impurities, the ratio of nickel and copper to the carbide forming elements being chosen to achieve a microstructure of between 3% and 10% delta-ferrite in the interdentritic regions thereof.

4. A method as claimed in claim 3 wherein the consumable electrode is chosen to give a deposited weld metal comprising by weight from 0.03% to 0.05% carbon, from 0.4% to 0.6% silicon, from 0.8% to 1.2% manganese, from 5.2% to 5.5% nickel, from 13.5% to 14.5% chromium, from 1.5% to 2.0% molybdenum, from 1.2% to 2.0% copper, from 0.25% to 0.5% niobium, from 0.01% to 0.02% nitrogen with sulphur and phosphorus each being below 0.04% the balance being iron and impurities.

* * * * *